Oct. 10, 1939.  E. S. RICK  2,175,617

METHOD AND APPARATUS FOR CLASSIFICATION OF FRUITS AND FOODSTUFFS

Filed June 25, 1937  2 Sheets-Sheet 1

Inventor
Edward S. Rick

By Lyon & Lyon
Attorneys

Oct. 10, 1939.  E. S. RICK  2,175,617
METHOD AND APPARATUS FOR CLASSIFICATION OF FRUITS AND FOODSTUFFS
Filed June 25, 1937   2 Sheets-Sheet 2
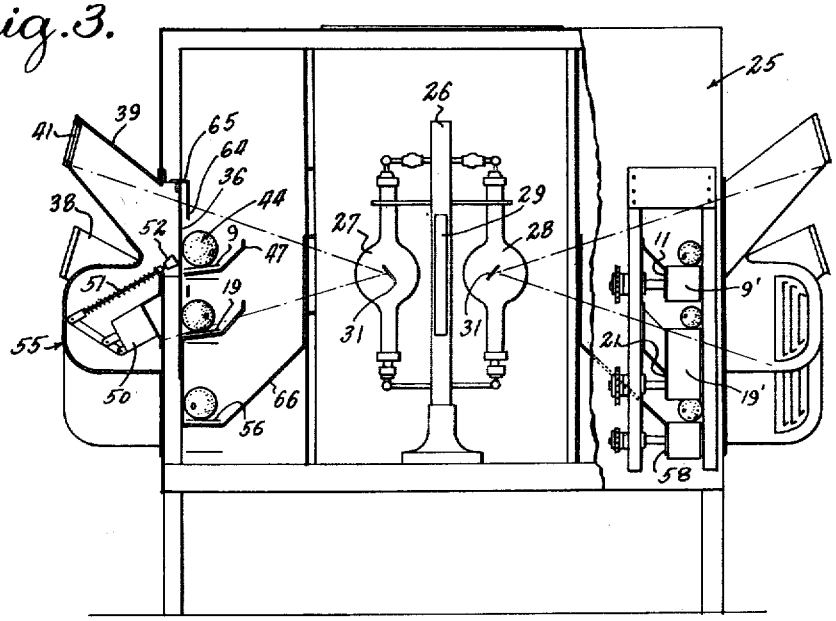
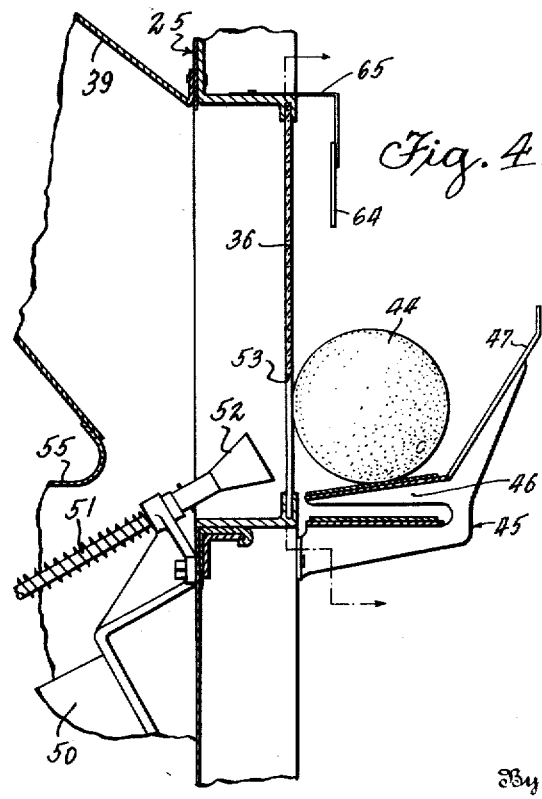
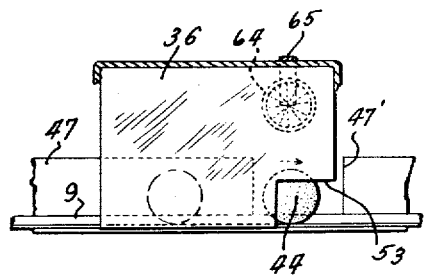
Inventor
Edward S. Rick
By Lyon & Lyon
Attorneys Patented Oct. 10, 1939

2,175,617

UNITED STATES PATENT OFFICE 2,175,617

METHOD AND APPARATUS FOR CLASSIFICATION OF FRUITS AND FOODSTUFFS

Edward S. Rick, Los Angeles, Calif., assignor to Food Machinery Corporation, San Jose, Calif., a corporation of Delaware Application June 25, 1937, Serial No. 150,371

15 Claims. (Cl. 250—52)

This invention relates to means and methods of inspecting and segregating various foodstuffs such as, for example, citrus fruit, avocados, melons, canned foodstuffs, etc., for the purpose of determining whether the foodstuffs, fruit or vegetable is diseased, frozen, or otherwise impaired in quality as by fermentation, presence of impurities, cell degeneration, molds, or the like. Furthermore, the method and apparatus of this invention may be used in determining the maturity of certain fruits and vegetables.

In many instances fruit, such as citrus fruit, for example, become diseased as by molds of the genus Alternaria, the destructive action extending through the stem end of the fruit and developing to a material extent within the fruit without any appreciable indication of such disease from the exterior. In other words, in order to determine the extent to which a fruit has been attacked by this particular form of disease, it is necessary, ordinarily, to cut the fruit open. Furthermore, in the event a citrus crop has been subjected to freezing weather at the wrong time of the year, it is difficult to segregate fruit which has been rendered woody by reason of the freezing temperatures, from fruit which has not been deleteriously affected. The method and apparatus of this invention, however, permits large volumes of fruit to be inspected in a rapid and economical manner and the presence of disease and other undesirable characteristics readily determined so that separation of the diseased or impaired fruit from satisfactory fruit may be readily accomplished.

Generally stated, the method of this invention contemplates subdividing a haphazard aggregation of fruit into orderly files which are then continuously advanced past zones of inspection, the files of fruit or other objects to be examined being subjected at such zones of inspection to X-ray emanations which upon passing through the fruit or objects are caused to impinge upon fluorescent screens to produce a visible image capable of being observed, such image definitely indicating the characteristics of the internal portions of the fruit or other object so that segregation of the undesired fruit or object from the moving file may be readily accomplished.

Furthermore, the invention contemplates an arrangement of elements whereby a single X-ray tube is caused to act upon two or more substantially parallel, vertically spaced files of objects simultaneously so that a relatively large number of objects may be simultaneously inspected with minimum expenditure for electrical current and X-ray tubes and within a limited area so that a compact testing unit of high capacity is made available.

It is an object of this invention, therefore, to disclose and provide a method of classifying fruits, vegetables and canned foodstuffs or other objects in accordance with the presence or absence of internal impurities or characteristics.

Another object of this invention is to disclose and provide a method of inspecting and classifying fruit such as citrus fruit, in order to determine the presence of internal decay, cell degeneration, or other internal change.

A further object of this invention is to disclose and provide a method of economically utilizing X-ray emanation in the fluoroscopic examinations of large numbers of discrete objects.

Another object of the invention is to disclose a machine in which a heterogeneous or fortuitous aggregation of objects may be arranged in orderly fashion and subjected to fluoroscopic examination.

A further object is to provide a machine or arrangement of elements whereby discrete objects may be rapidly passed through a zone of fluoroscopic examination or inspection and a suitable separation or segregation made.

A still further object is to provide an arrangement of elements whereby large numbers of discrete objects may be subjected to fluoroscopic examination, a plurality of objects being simultaneously subjected to X-ray emanations from a single source.

It is also an object of this invention to provide means whereby clear cut and well defined images of objects being examined may be attained on the fluoroscopic screens.

These and other objects, uses, advantages, adaptations and modifications of the invention will become apparent to those skilled in the art from the following detailed description of a preferred mode of operation and of illustrative form of apparatus. Although as stated hereinabove the invention is adapted for use in the examination and classification of numerous discrete objects, the subsequent description will be particularly directed to a form of apparatus particularly adapted to handle citrus fruit such as oranges, grapefruit and tangerines or other fruits and vegetables such as avocados and melons.

In describing the invention, reference will be had to the appended drawings, in which:

Fig. 3 is a vertical transverse section taken along the plane III—III of Fig. 2.

Fig. 4 is an enlarged view of a portion of the machine shown in Fig. 3.

Fig. 5 is a longitudinal view of an inspection zone, partly diagrammatic, said view being taken substantially along the plane V—V of Fig. 4.

Heretofore it has been known that X-ray emanations could be passed through an object to form an image on a fluoroscopic screen, from which image the character of the object could be determined. When relatively small discrete objects such as citrus fruit, avocados or cans of food stuff, are being examined for the purpose of separating impaired objects from an aggregation thereof, difficulty has been experienced in being able to handle sufficiently large quantities or numbers to render the operation economically successful. Furthermore, no means have been provided by the prior art whereby clear and distinct images could be obtained on the fluoroscopic screen and in addition the emanations of an X-ray tube have not been utilized to maximum advantage so that prior machines required a large number of tubes in order to permit simultaneous inspection of a large number of objects.

Figure 1:
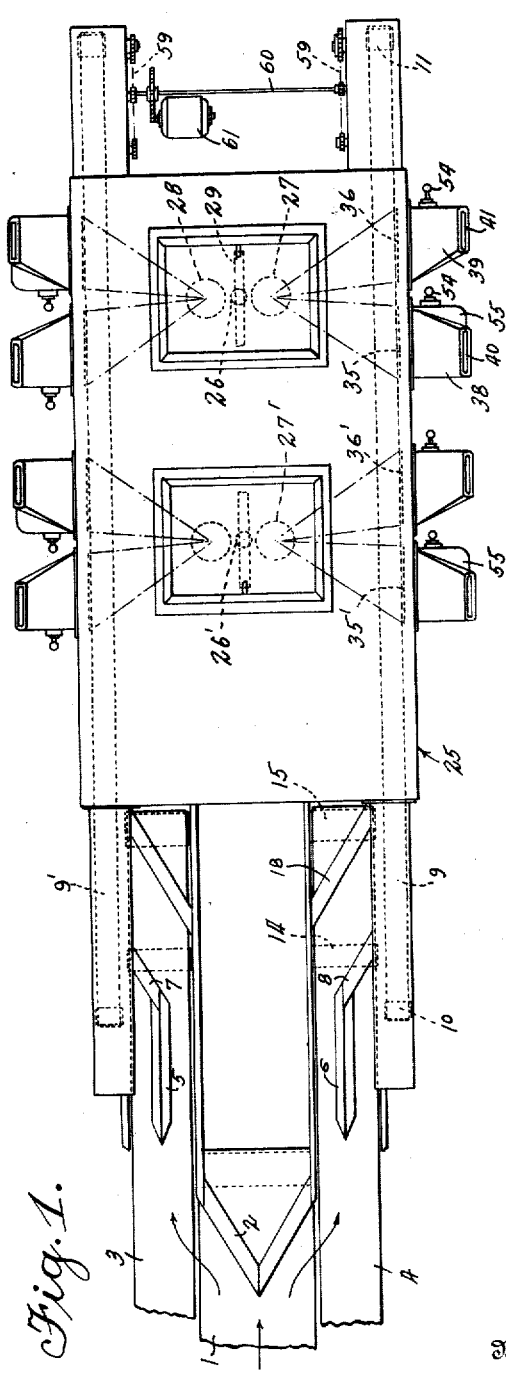
Fig. 1 is a plan view of a complete machine.

These various objections have been overcome by the method and apparatus of this invention. As shown in Fig. 1, for example, a fortuitous or haphazard aggregation of objects such as oranges, for example, may be fed to the testing unit as by means of a conveyor belt 1, this aggregation of fruit being then split as by means of the inclined partitions 2 so as to feed fruit onto conveyor belts 3 and 4 moving in the same general direction, i. e., to the right in the drawings. The aggregations of fruit on the conveyor belts 3 and 4 are then further split into single files by means of the partitions 5 and 6, which partitions terminate in the inclined portions 7 and 8 respectively. Fruit passing on one side of the partition 6 are directed onto a relatively narrow continuous conveyor belt 9 which passes over a roller 10 at one end and a driven roller 11 at the other end. Suitable idler rollers such as 12 or slide members such as 13, cause the lower lay of the belt to closely approach the upper lay. The belt 4 passes over the roller 14 and is then downwardly directed to pass over a roller 15, the lower portion of the belt 4 being suitably supported upon an idler 16.

Immediately below the belt 9 is another continuous conveyor belt 19 which passes over the roller 20 at one end and a driven roller 21 at the other end, the lower lays of said belt being suitably supported by idlers, slide members, or the like. In this manner, fruit fed by the auxiliary belt 4 are split into two single files by the partition 6, fruit on one side of said partition being directed onto the upper belt by the inclined partition 8 whereas fruit passing on the other side of the partition 6 falls down the inclined portion of the belt 4 and is then directed by means of the inclined partition 18 onto the lower belt 19. The belts 9 and 19, therefore, are adapted to carry single files of fruit through the inspection zones of the machine.

It is to be understood that the machine itself is provided with a suitable frame-work adapted to support the various rollers, conveyor belts, etc., and includes a housing 25 which is preferably provided with lead sheathing or lead walls to prevent straight X-ray emanations from impinging on the workers or operators.

Furthermore, although one side of the machine fed by the auxiliary conveyor 4 has been described specifically, it is to be understood that the auxiliary conveyor 3 similarly supplies fruit to similar belts 9' and 19' on the other side of the machine so that in effect four single files of fruit move through the machine at the same time, these four files being arranged into two groups, two files in substantially parallel horizontally extending but vertically spaced relation constituting one group. Centrally positioned within the housing 25 are suitable standards 26 and 26' supporting X-ray tubes 27 and 28. The standards 26 are provided with longitudinally extending vertical lead shields 29, said shields being adapted to prevent radiations of the tubes 27 from interfering with the radiations from tubes 28. The tubes 27 are so positioned as to throw X-ray emanations toward the belts 9 and 19 whereas the tubes 28 are designed to discharge their emanations toward the belts 9' and 19'. Suitable transformers 30 may be positioned within the housing for the purpose of supplying the required high voltage current to the tubes. Conductors connecting the tubes with the transformers and supplying current to the transformers are not shown since those skilled in the electrical arts are fully advised as to the required connections, types of transformers, etc.

Attention is called to the fact, however, that each X-ray tube has the property of discharging its emanations in the form of a fan-shaped beam, which beam (in a plane at right angles to the axis of the tube) will subtend an arc in the order of 60°. This band of emanations in a plane longitudinal to the axis of the tube is only of the order of about 16°. In other words, if the tubes 27 have their longitudinal axis in the vertical position, as shown in Figs. 1 and 3, the horizontal distribution of the beams indicated by dotted lines in Fig. 1 will be about 60°. From the side, however, as for example in Fig. 3, it will be found that a much smaller angle of distribution exists, as indicated by the dotted lines in Fig. 3. In order to most effectively utilize this entire band or emanations, the target or anode 31 is so positioned that it is intersected by a horizontal plane passing through the upper belt 9. The distance between the vertical axis of the tube 27 and the side wall of the housing 25 is so proportioned that the height of the beam would cover any objects carried by the upper belt 9 and also cover objects carried by the lower belt 19. By placing the upper and lower lays of the belt 9 close together, as by idler 12, the objects on belts 9 and 19 are more effectively placed within the range of X-ray emanations.

Figure 2:
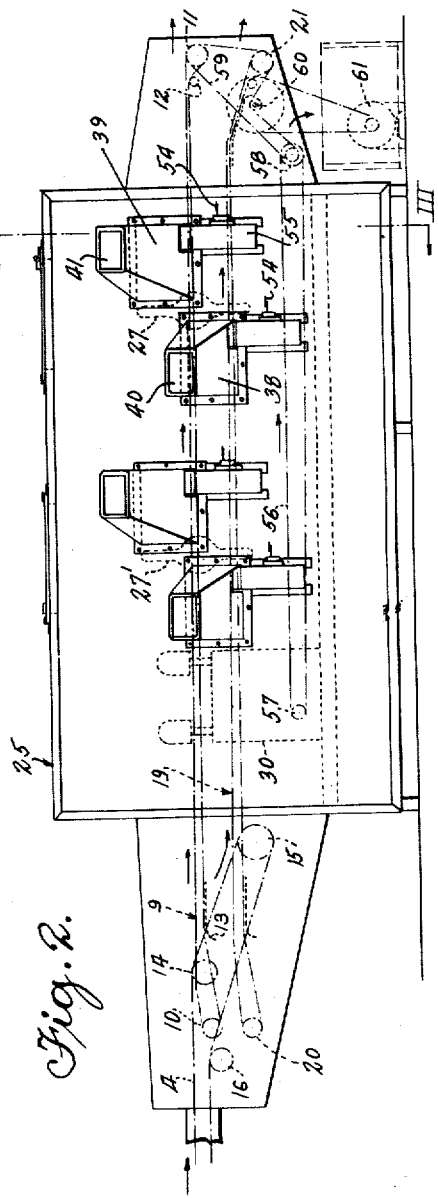
Fig. 2 is a side elevation of the same.

A substantially rectangular area of the side walls of the housing 25 is thus covered by emanations from each of the tubes and the objects carried on the belts 9 and 19' pass through this area. In order to effectively utilize this area, two diagonally related fluoroscopic screens are positioned in the side walls of the housing 25 opposite each tube, said fluoroscopic screen being closely adjacent to the edges of the belts 9 and 19'. As shown in Fig. 1, for example, fluoroscopic screens 35 and 36 are positioned opposite the tube 27 whereas screens 35' and 36' are positioned opposite the tube 27'. It is to be noted that the fluorescent screen 36 is at the level of the upper belt 9 whereas the fluorescent screen 35 is at the level of the belt 19. Shielded, angularly extending inspection hoods 38 and 39 are attached to the sides of the housing 25, these inspection hoods being provided with lead glass windows 40 and 41, the hoods 38 and 39 being inclined away from one another as shown in Figs. 1 and 2, and also upwardly as shown in Fig. 3, so that two observers may stand in adjacent positions for the purpose of simultaneously inspecting the fluorescent screens 35 and 36 and at the same time be out of the direct rays of X-ray emanations from the tubes. As shown in Fig. 3, for example, it is impossible for a ray discharged by the tube to pass through the fluorescent screen and impinge upon the observer, the rays passing through the screen being absorbed by the heavily shielded inspection hoods.

The fluorescent screens 35 and 36 may be made of any suitable fluorescent material rendered active by the emanations of the tubes and the particular composition of the fluorescent screens need not be described in detail here since such compositions are well known in the art.

In order to produce a clear cut, well defined image on the screen, means are provided whereby the objects to be examined are caused to have at least one side of the file of objects in alignment with the side of the housing 25 and pass practically in contact with the fluorescent screen. For example, the lays of the belt 9, as shown in greater detail in Fig. 4, may be supported by means of a bracket 45 attached to the inner surface of the housing 25, the form of bracket shown in this figure supporting the lower lay of the belt as well as the upper lay. The upper lay of the belt is inclined by means of a support 46 of the bracket 45 so that any object, such as the orange 44 carried by the belt 9, is moved toward the screen 36 and caused to slide therealong. These brackets 45 may also be provided with a guard 47 connecting the various brackets, the guard being adapted to prevent the fruit 44 from rolling off the belt into the interior of the machine. The guard 47, however, is cut out in parts so as to permit discharge of objects from the belt 9 at desired points.

Associated with each inspection hood are means for selectively removing objects from the belts. For example, such means may comprise a solenoid 50 operatively connected to a plunger 51 provided with a head 52. The plungers 51 may be provided with spring means for normally maintaining them in withdrawn position, as indicated in Fig. 3. These plungers are adapted to operate through a suitable aperture 53 formed in the fluorescent screen 36. Opposite said aperture 53 is a cut out portion 47' in the inclined guard 47 connecting the various brackets 45. The solenoid 50 may be energized by means of a switch lever 54 carried by the housing 55 which encloses the solenoid, plunger, etc. When the observer peering through the shielded observation hood sees that the image on the fluorescent screen represents an undesired object, he closes a contact by means of the switch 54, thereby energizing the solenoid 50 and causing the plunger 51 to project into the machine through the aperture 53 of the fluorescent screen 36, thereby pushing the object, such as the fruit 44, off the belt 9 and onto a cull discharge conveyor 56 which is operatively positioned at the bottom of a chute 66 made of canvas, light metal, or the like. The discharge belt 56 is mounted on suitable rollers 57 and 58 and the rollers 58, 11 and 21 may be interconnected as by means of a driving chain 59 to a driving shaft 60 which in turn is driven by means of a suitable motor 61. The culls or imperfect articles may be discharged by the belt 56 onto a suitable cross conveyor, cull box, or other means whereas the inspected and acceptable objects are separately discharged by belts 9 and 19 onto another conveyor or into a desired bin (not shown).

In the particular embodiment shown in the drawings it will be seen that the objects carried by the belts 9 and 19 are subjected to sequential inspections. It has been found that when the objects are passing the fluorescent screens rapidly, it may be necessary for two observers to work on the same belt, one of the observers eliminating from the continuous file of objects those which are obviously imperfect to him whereas the secondary observer makes a further selection. It is to be understood, however, that in many instances it is not necessary to have such double inspection of a single file of objects and sufficient capacity is attained by using but a single inspection.

In order to further facilitate the inspector's work and provide him with some visible image for the sake of comparison, a disc of aluminum or other metal suitably etched, cut, plated or otherwise treated to cast an image upon a fluorescent screen while under the influence of X-rays similar to an image of the type of imperfect object for which the examination and selection is being made, may be positioned in an upper portion of the fluorescent screen and between such screen and the X-ray tubes. For example, a metallic disc 64 may be suspended by means of a bracket 65 between the fluorescent screen 36 and the tube and in the upper portion of the fluorescent screen so as to cast an image upon said screen which is identical to that of a citrus fruit diseased with Alternaria. Then when citrus fruits are being examined for the presence of Alternaria, the observer upon looking through the inspection hood will have before him constantly the image of a diseased fruit so that he can more readily identify the image of an actual fruit showing evidence of such disease and selectively remove such diseased fruit by actuation of the kick-off means.

It is to be remembered that the particular kick-off means shown are simply illustrative of a large number of various means which can be used for this purpose. Such kick-off means may be electrically operated as shown or they may be purely mechanical. They may operate a plunger, bell crank lever, trap or vane adapted to direct or discharge the diseased or undesired object off the inspection belt into a discharge hopper or onto a discharge or cull belt. The electrical connections used in controlling the solenoid-actuated kick-off shown in the drawings have not been specifically described since those skilled in the art are well advised as to such electrical connections.

As pointed out hereinabove, the machine and method of this invention may be utilized not only in the selection of diseased or impaired citrus fruit but also in the treatment of various fruits and vegetables, canned foodstuffs, or other discrete objects. Avocados, for example, may be subjected to a fluoroscopic examination in the manner stated for the purpose of determining their maturity, it having been found that the maturity of an avocado may be determined in this manner by observing on the fluoroscopic screen the spacings between the seed and the meat of the avocado.

I claim:

1. A method of fluoroscopic examination of discrete objects comprising: continuously advancing a fortuitous aggregation of objects to be examined, separating said objects to form two or more horizontally extending single files thereof in vertically disposed relation, advancing each of said files of objects past a zone of inspection, and subjecting said files of objects to radiation from a source of X-rays while at said zones of inspection.

2. A method of fluoroscopic examination of discrete objects comprising: continuously advancing a fortuitous aggregation of objects to be examined, separating said objects to form two horizontally extending single files thereof in vertically disposed relation, advancing each of said files of objects past a zone of inspection, maintaining one side of said objects in substantial contact with the fluoroscopic screen at said zone of inspection, and subjecting both of said files of objects to radiation from a single source virtually lateral to the advancing files of objects while at said zones of inspection.

3. A method of examining whole citrus fruit to determine internal defects, which comprises: continuously advancing a fortuitous aggregation of citrus fruit, separating said fruit to form at least two horizontally extending single files thereof in vertically spaced relation, continuously advancing each of said files of fruit past a zone of inspection including a fluoroscopic screen, and subjecting both of said files of fruit simultaneously to X-ray examinations from a single source while said fruit is at said zones of inspection.

4. A method of examining whole citrus fruit to determine internal defects, which comprises: continuously advancing a fortuitous aggregation of citrus fruit, separating said fruit to form at least two horizontally extending single files thereof in vertically spaced relation, continuously advancing each of said files of fruit past a zone of inspection including a fluoroscopic screen, maintaining said fruit in substantial contact with said fluoroscopic screen at said zones of inspection, and subjecting both of said files of fruit simultaneously to X-ray emanations from a single source while said fruit is at said zones of inspection.

5. In an apparatus for the continuous inspection of internal structure of discrete objects, the combination of means for feeding a fortuitous aggregation of objects; means cooperating with said feeding means for separating said objects into at least two single files; means for moving said single files along substantially horizontal planes in vertically spaced relation; a fluorescent screen adjacent each of said single file-moving means; an X-ray tube operatively positioned with respect to said file-moving means and screens and adapted to simultaneously subject objects on said vertically spaced file moving means to the action of X-rays.

6. In an apparatus for the continuous inspection of internal structure of discrete objects, the combination of means for feeding a fortuitous aggregation of objects; means cooperating with said feeding means for separating said objects into single files; means for moving said single files along substantially horizontal planes in vertically spaced relation; a fluorescent screen adjacent each of said single file-moving means; an X-ray tube operatively positioned with respect to said file-moving means and screens and adapted to simultaneously subject objects on said vertically spaced file-moving means to the action of X-rays passing in a virtually lateral direction with respect to the file moving means, and means positioned at said fluorescent screens and in operative relation to said file-moving means operative to remove objects from said file-moving means.

7. In an apparatus for the continuous inspection of internal structure of discrete objects, the combination of means for feeding a fortuitous aggregation of objects; means cooperating with said feeding means for separating said objects into single files; means for moving said single files along substantially horizontal planes in vertically spaced relation; a fluorescent screen adjacent each of said single file-moving means; an X-ray tube operatively positioned with respect to said file-moving means and screens and adapted to simultaneously subject objects on said vertically spaced file-moving means to the action of X-rays, and shielded inspection hoods angularly extending from around said screens whereby the observer is not in direct line of X-ray emanations from said tube.

8. In an apparatus for the continuous inspection of internal structure of discrete objects, the combination of means for feeding a fortuitous aggregation of objects; means cooperating with said feeding means for separating said objects into single files; means for moving said single files along substantially horizontal planes in vertically spaced relation; a fluorescent screen adjacent each of said single file-moving means; means operatively arranged with respect to said file-moving means for positioning said objects in substantial contact with said fluorescent screen; an X-ray tube operatively positioned with respect to said file-moving means and screens and adapted to simultaneously subject objects on said vertically spaced file-moving means to the action of X-rays.

9. In an apparatus for the continuous inspection of internal structure of discrete objects, the combination of means for feeding a fortuitous aggregation of objects; means cooperating with said feeding means for separating said objects into single files; means for moving said single files along substantially horizontal planes in vertically spaced relation; a fluorescent screen in a virtually vertical plane adjacent each of said single file-moving means; means operatively arranged with respect to said file-moving means for positioning said objects in substantial contact with said fluorescent screen; an X-ray tube operatively positioned with respect to said file-moving means and screens and adapted to simultaneously subject objects on said vertically spaced file-moving means to the action of X-rays; and means positioned at said fluorescent screens and in operative relation to said file-moving means operative to remove objects from said file-moving means.

10. In an apparatus for the continuous inspection of internal structure of discrete objects, the combination of means for feeding a fortuitous aggregation of objects; means cooperating with said feeding means for separating said objects into single files; means for moving said single files along substantially horizontal planes in vertically spaced relation; a vertical fluorescent screen adjacent each of said single file-moving means; means operatively arranged with respect to said file-moving means for positioning said objects in substantial contact with said fluorescent screen; an X-ray tube operatively positioned with respect to said file-moving means and screens and adapted to simultaneously subject objects on said vertically spaced file-moving means to the action of X-rays; and shielded inspection hoods angularly extending from around said screen whereby an observer is not in direct line of X-ray emanations from said tubes.

11. In an apparatus for the continuous inspection of internal structure of discrete objects, the combination of means for feeding a fortuitous aggregation of objects; means cooperating with said feeding means for separating said objects into single files; means for moving said single files along substantially horizontal planes in vertically spaced relation; a fluorescent screen in a vertical plane adjacent each of said single file-moving means; an X-ray tube operatively positioned with respect to said file-moving means and screens and adapted to simultaneously subject objects on said vertically spaced file-moving means to the action of X-rays from a single X-ray tube; and a stationary comparison-image producing means positioned between said tube and a portion of said fluorescent screen.

12. In an apparatus for the continuous inspection and selection of discrete objects, the combination of: means for moving single files of objects along substantially horizontal planes in vertically spaced relation; a fluorescent screen adjacent each of said single file-moving means; an X-ray tube operatively positioned with respect to said file-moving means and screens and adapted to simultaneously subject objects on said spaced file-moving means to the action of X-rays; and means positioned at said fluorescent screens and in operative relation to said file-moving means operative to remove objects from said file-moving means.

13. In an apparatus for the continuous inspection and selection of discrete objects, the combination of: means for moving single files of objects along a substantially horizontal plane in vertically spaced relation; a fluorescent screen in a vertical plane adjacent each of said single file-moving means; means operatively arranged with respect to said file-moving means for positioning objects thereon in substantial contact with said fluorescent screen; and an X-ray tube operatively positioned with respect to said file-moving means and screens and adapted to simultaneously subject objects on said vertically spaced file-moving means to the action of X-rays from said single X-ray tube.

14. In a method of examining citrus fruit fluoroscopically, the steps of: passing a single file of citrus fruit in a virtually vertical plane between a source of X-ray emanations and a fluoroscopic screen, said fruit being adjacent said screen, and passing emanations in a substantially horizontal plane through said fruit and into said screen whereby a well defined image of the fruit structure is obtained on the screen, and viewing said screen directly from a point transversely removed from the direction of emanations between said source and screen.

15. In a method of examining citrus fruit fluoroscopically, the steps of: advancing a single file of citrus fruit between a source of X-ray emanations and a substantially vertical fluoroscopic screen, said fruit being adjacent said screen, and passing substantially unimpeded emanations directly through said fruit in a substantially horizontal plane whereby a well defined image of the fruit structure is obtained on the screen, and viewing said screen directly from a point transversely removed from the direction of emanations between said source and screen.

EDWARD S. RICK.

---

CERTIFICATE OF CORRECTION.

Patent No. 2,175,617. October 10, 1939.

EDWARD S. RICK.

It is hereby certified that error appears in the printed specification of the above numbered patent requiring correction as follows: Page 5, first column, line 30, claim 12, after the word "X-rays" and before the semicolon insert from a single X-ray tube; and that the said Letters Patent should be read with this correction therein that the same may conform to the record of the case in the Patent Office.

Signed and sealed this 6th day of February, A. D. 1940.

(Seal)

Henry Van Arsdale,
Acting Commissioner of Patents.

spection hoods angularly extending from around said screen whereby an observer is not in direct line of X-ray emanations from said tubes.

11. In an apparatus for the continuous inspection of internal structure of discrete objects, the combination of means for feeding a fortuitous aggregation of objects; means cooperating with said feeding means for separating said objects into single files; means for moving said single files along substantially horizontal planes in vertically spaced relation; a fluorescent screen in a vertical plane adjacent each of said single file-moving means; an X-ray tube operatively positioned with respect to said file-moving means and screens and adapted to simultaneously subject objects on said vertically spaced file-moving means to the action of X-rays from a single X-ray tube; and a stationary comparison-image producing means positioned between said tube and a portion of said fluorescent screen.

12. In an apparatus for the continuous inspection and selection of discrete objects, the combination of: means for moving single files of objects along substantially horizontal planes in vertically spaced relation; a fluorescent screen adjacent each of said single file-moving means; an X-ray tube operatively positioned with respect to said file-moving means and screens and adapted to simultaneously subject objects on said spaced file-moving means to the action of X-rays; and means positioned at said fluorescent screens and in operative relation to said file-moving means operative to remove objects from said file-moving means.

13. In an apparatus for the continuous inspection and selection of discrete objects, the combination of: means for moving single files of objects along a substantially horizontal plane in vertically spaced relation; a fluorescent screen in a vertical plane adjacent each of said single file-moving means; means operatively arranged with respect to said file-moving means for positioning objects thereon in substantial contact with said fluorescent screen; and an X-ray tube operatively positioned with respect to said file-moving means and screens and adapted to simultaneously subject objects on said vertically spaced file-moving means to the action of X-rays from said single X-ray tube.

14. In a method of examining citrus fruit fluoroscopically, the steps of: passing a single file of citrus fruit in a virtually vertical plane between a source of X-ray emanations and a fluoroscopic screen, said fruit being adjacent said screen, and passing emanations in a substantially horizontal plane through said fruit and into said screen whereby a well defined image of the fruit structure is obtained on the screen, and viewing said screen directly from a point transversely removed from the direction of emanations between said source and screen.

15. In a method of examining citrus fruit fluoroscopically, the steps of: advancing a single file of citrus fruit between a source of X-ray emanations and a substantially vertical fluoroscopic screen, said fruit being adjacent said screen, and passing substantially unimpeded emanations directly through said fruit in a substantially horizontal plane whereby a well defined image of the fruit structure is obtained on the screen, and viewing said screen directly from a point transversely removed from the direction of emanations between said source and screen.

EDWARD S. RICK.

CERTIFICATE OF CORRECTION.

Patent No. 2,175,617.   October 10, 1939.

EDWARD S. RICK.

It is hereby certified that error appears in the printed specification of the above numbered patent requiring correction as follows: Page 5, first column, line 30, claim 12, after the word "X-rays" and before the semicolon insert from a single X-ray tube; and that the said Letters Patent should be read with this correction therein that the same may conform to the record of the case in the Patent Office.

Signed and sealed this 6th day of February, A. D. 1940.

(Seal)   Henry Van Arsdale, Acting Commissioner of Patents.